United States Patent
Zhou

(10) Patent No.: US 8,855,571 B2
(45) Date of Patent: Oct. 7, 2014

(54) RADIO COMMUNICATION APPARATUS, SYSTEM, AND METHOD

(71) Applicant: Fujitsu Limited, Kawasaki (JP)

(72) Inventor: Liang Zhou, Yokohama (JP)

(73) Assignee: Fujitsu Limited, Kawasaki (JP)

(*) Notice: Subject to any disclaimer, the term of this patent is extended or adjusted under 35 U.S.C. 154(b) by 130 days.

(21) Appl. No.: 13/737,950

(22) Filed: Jan. 10, 2013

(65) Prior Publication Data

US 2013/0225089 A1    Aug. 29, 2013

(30) Foreign Application Priority Data

Feb. 28, 2012   (JP) ................... 2012-042534

(51) Int. Cl.
| | |
|---|---|
| H04B 1/00 | (2006.01) |
| H04B 15/00 | (2006.01) |
| H04B 7/08 | (2006.01) |
| H04B 7/04 | (2006.01) |
| H04B 7/06 | (2006.01) |

(52) U.S. Cl.
CPC ............ *H04B 7/0822* (2013.01); *H04B 7/0417* (2013.01); *H04B 7/0691* (2013.01); *H04B 7/061* (2013.01)
USPC .... 455/63.4; 455/101; 455/553.1; 455/562.1; 375/267

(58) Field of Classification Search
USPC ........ 455/63.1, 63.4, 68, 69, 101, 132, 550.1, 455/552.1, 553.1, 560, 561, 562.1; 375/267, 299
See application file for complete search history.

(56) References Cited

U.S. PATENT DOCUMENTS

| | | | | |
|---|---|---|---|---|
| 6,473,393 | B1 * | 10/2002 | Ariyavisitakul et al. | 370/203 |
| 7,006,804 | B1 * | 2/2006 | Clark et al. | 455/105 |
| 7,379,759 | B2 * | 5/2008 | Nakaya et al. | 455/562.1 |
| 7,978,784 | B2 | 7/2011 | Zhang et al. | |
| 8,086,273 | B2 | 12/2011 | Zhou | |
| 8,213,539 | B2 | 7/2012 | Zhang et al. | |
| 8,412,110 | B2 * | 4/2013 | Breit et al. | 455/67.11 |
| 8,494,076 | B2 * | 7/2013 | Hayase et al. | 375/267 |

FOREIGN PATENT DOCUMENTS

| | | |
|---|---|---|
| JP | 2009-182964 | 8/2009 |
| JP | 2010-525683 | 7/2010 |
| JP | 2010-259049 | 11/2010 |
| WO | WO-2009/009199 | 1/2009 |

* cited by examiner

*Primary Examiner* — Nhan Le
(74) *Attorney, Agent, or Firm* — Fujitsu Patent Center

(57) ABSTRACT

A first radio communication apparatus includes receiving antennas, an antenna selection processing unit that selects a transmitting antenna from transmitting antennas included in a second radio communication apparatus, generates a set that includes antenna indexes each indicating each of transmitting antennas, rearranges the antenna indexes in sequence starting from an antenna index indicating the selected transmitting antenna, generates a channel matrix in which a column corresponding to the selected transmitting antenna is located at a top, and a selected-channel matrix composed of the column, multiplies an inverse matrix of the channel matrix by the selected-channel matrix to generate an evaluation matrix, rearranges the antenna indexes in the set according to values of elements in the evaluation matrix, and selects an antenna to be used according to the rearranged antenna indexes, and a transmitting unit that transmits an antenna index indicating the selected antenna to the second radio communication apparatus.

11 Claims, 11 Drawing Sheets

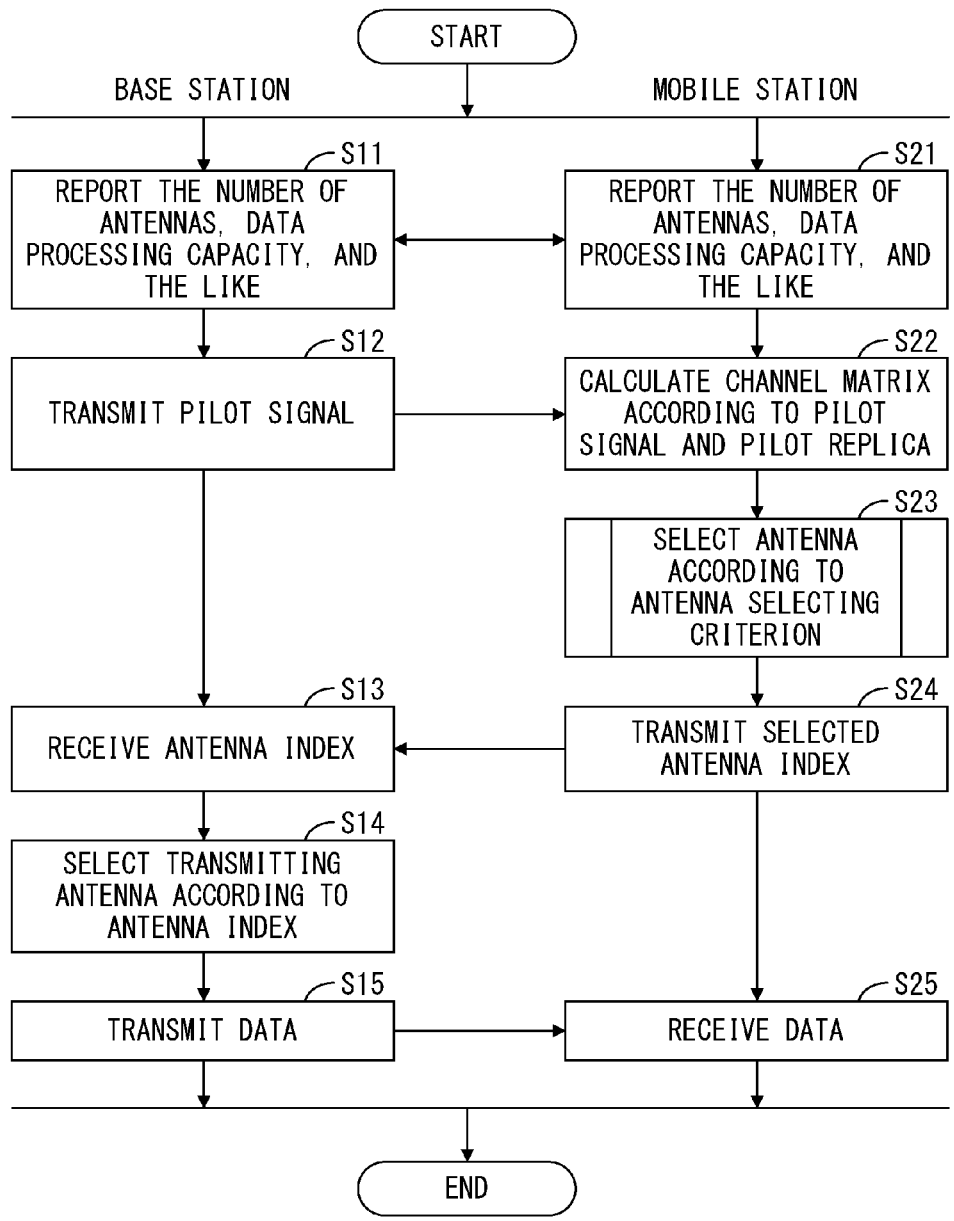
F I G. 2

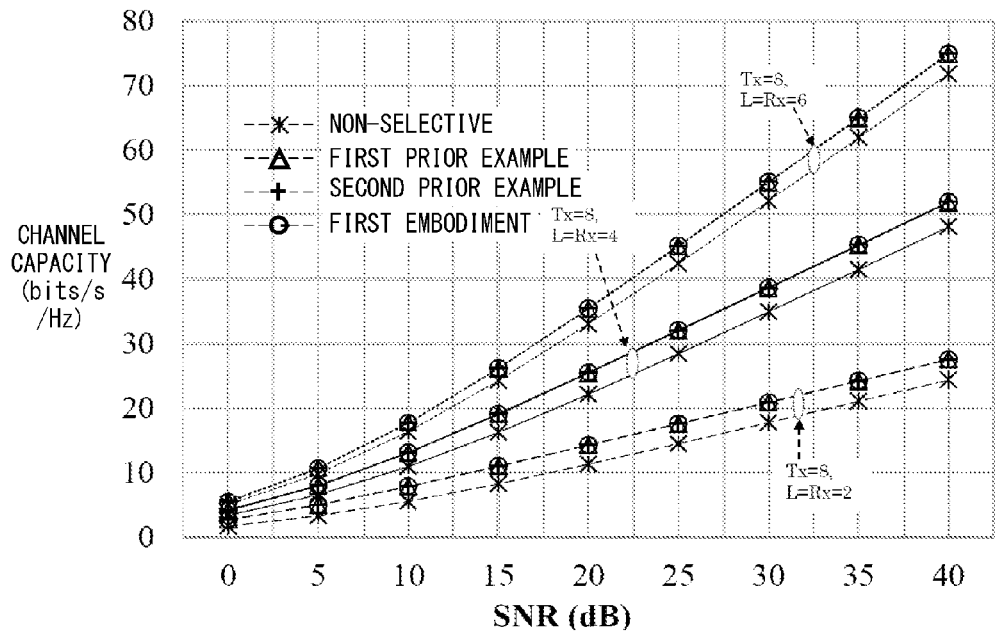
F I G. 5

| CONFIGURATION (Nt, L) | EMBODIMENT | FIRST PRIOR EXAMPLE | SECOND PRIOR EXAMPLE |
|---|---|---|---|
| 8, 6 | 576 | 1188 | 12096 |
| 8, 4 | 256 | 416 | 8960 |
| 8, 2 | 64 | 60 | 448 |

FIG. 7

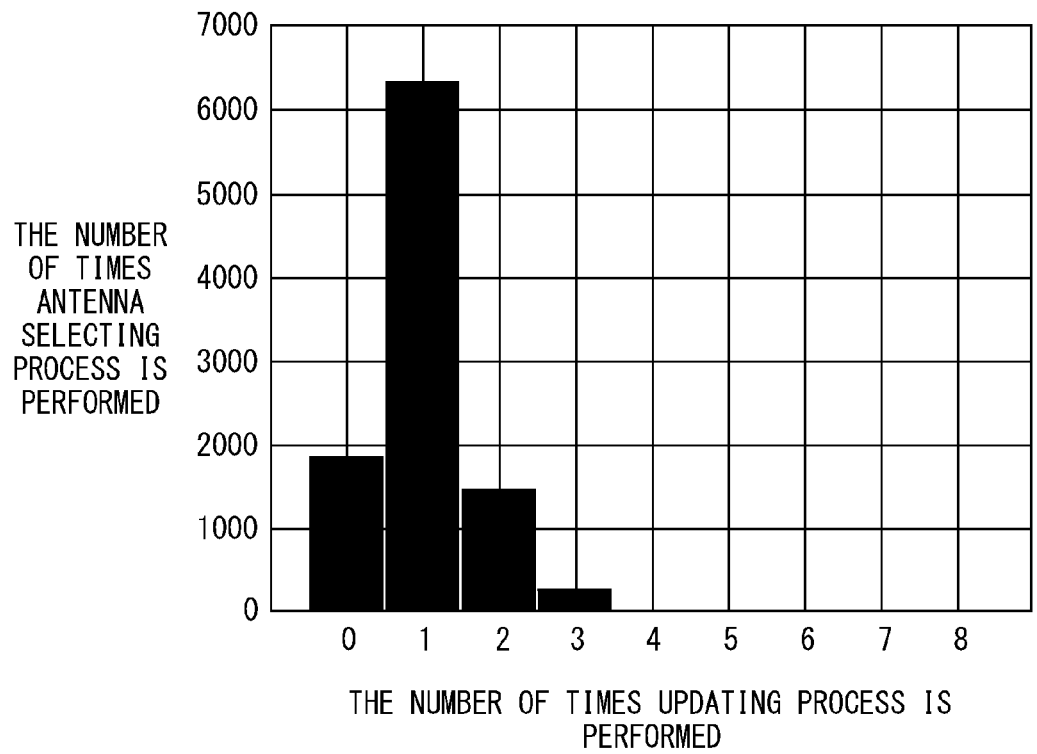
F I G. 8

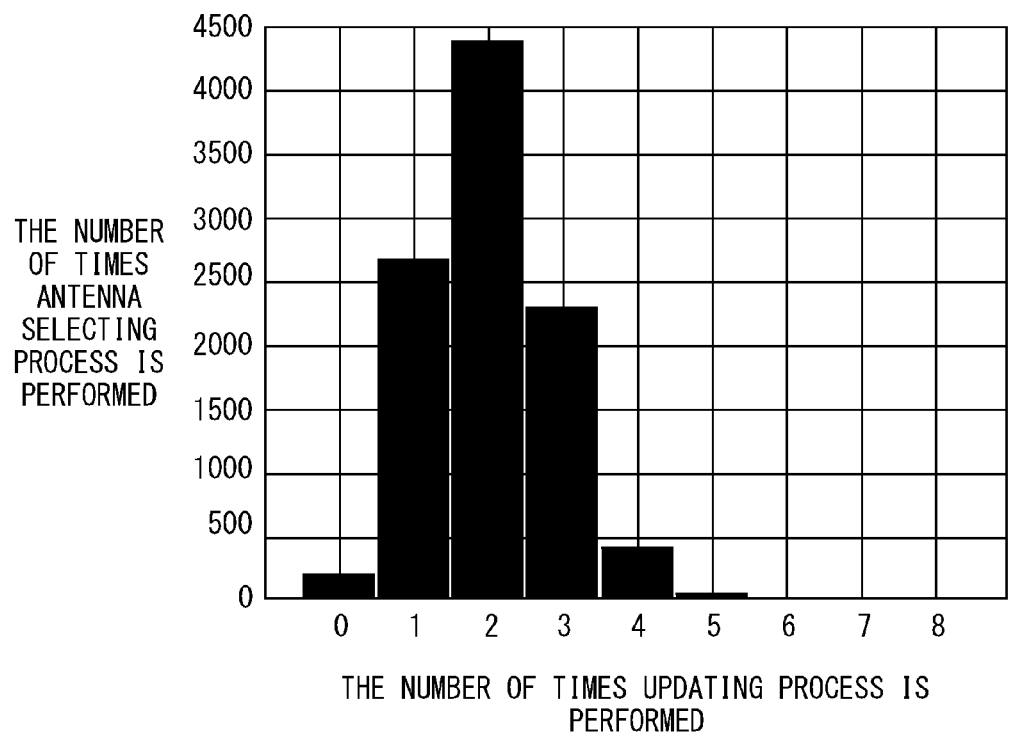
F I G. 9

RADIO COMMUNICATION APPARATUS, SYSTEM, AND METHOD

CROSS-REFERENCE TO RELATED APPLICATION

This application is based upon and claims the benefit of priority of the prior Japanese Patent Application No. 2012-042534, filed on Feb. 28, 2012, the entire contents of which are incorporated herein by reference.

FIELD

The embodiments described herein are related to a radio communication apparatus, a radio communication system, and a radio communication method which rely on a multiple input multiple output (MIMO) communication technology.

BACKGROUND

In recent years, in the field of radio communication, MIMO communication technologies have been proposed in an attempt to improve communication performances, e.g., in an attempt to enhance transmission rate, increase communication capability, and improve reception qualities.

In a MIMO communication technology, a plurality of antennas are provided at both a radio communication apparatus on the transmission side and a radio communication apparatus on the reception side. The radio communication apparatus on the transmission side divides transmitted data into a plurality of data streams and simultaneously transmits the plurality of divided data streams at the same frequency band using a plurality of antennas. Meanwhile, using a plurality of antennas, the radio communication apparatus on the reception side receives a signal that is obtained by mixing, on a propagation path, the plurality of data streams transmitted from the radio communication apparatus on the transmission side. Using a channel matrix that represents the state of communication paths (channels), the radio communication apparatus on the reception side separates into individual streams the plurality of data streams transmitted from the radio communication apparatus on the transmission side from the signal received by each of the plurality of antennas, thereby restoring the transmitted data.

In radio communication systems using a MIMO technology, increasing the number of channels by increasing the number of antennas used to transmit or receive data may improve communication performance. Accordingly, attention is paid to increasing the number of antennas provided at a radio communication apparatus.

However, increasing the number of used antennas also increases the number of circuits such as amplifiers connected to the antennas, so power consumption of the radio communication apparatus will increase. For a radio communication apparatus on the reception side, a calculation process for separating a plurality of data streams individually from signals received by a plurality of antennas becomes complicated, and hence a complexity of the entire system will increase.

Accordingly, in order to solve the aforementioned problem associated with an increase in the number of used antennas, a technology has been proposed for selecting an antenna to be used for communication from a plurality of antennas provided at a radio communication apparatus.

The following prior art relates to a radio communication system that relies on a MIMO radio technology. That is, an encoded spatial data stream for transmission is delivered to a plurality of transmission chains by using a spatial diffusion matrix. The spatial diffusion matrix is used for a calculation to select an antenna of a transmitter. A receiver is aware of and may use a spatial diffusion matrix for calculations to select a transmitting antenna, select a receiving antenna, and select a joint transmitting/receiving antenna. The number of spatial data streams is smaller than the number of transmission chains or reception chains between a transmitter and a receiver, and the number of transmission chains or reception chains is smaller than the number of corresponding transmitting antennas or receiving antennas.

The following is another prior art. In the following descriptions, an antenna selecting method in accordance with the following prior art will be referred to as a "first prior example" for convenience. That is, to perform MIMO communication by selecting L (L is an integer that is two or greater) antennas from N (N is an integer that is two or greater) antennas provided at a radio communication apparatus, firstly, a first antenna is selected from the N antennas. An inverse matrix B1 of a channel matrix H1 of the selected first antenna is calculated. Next, the selected first antenna is combined with each of the not-selected N−1 antennas so as to generate N−1 antenna groups. An inverse matrix B2 of each of the N−1 antenna groups is calculated using the channel matrix H1 and the inverse matrix B1. A second antenna that conforms to a predetermined antenna selection criterion is selected from the not-selected N−1 antennas by using the calculated N−1 inverse matrixes B2. The predetermined antenna selection criterion includes a criterion of maximizing the minimum value of a signal to interference noise ratio (SINR) and a criterion of minimizing a means square error (MSE). Such processes are repeated until L antennas are selected.

In the aforementioned antenna selecting technology, the following antenna selecting method may be used to select an antenna with an outstanding communication performance from a plurality of antennas provided at a radio communication apparatus.

In the case of selecting L (L is an integer that is two or greater) antennas from N (N is an integer that is two or greater) antennas provided at a radio communication apparatus, there are $_NC_L$ antenna combinations in total. Accordingly, all of the $_NC_L$ antenna combinations are selected as antenna candidates for use in communication, and a calculation relating to communication performances for the $_NC_L$ antenna combination candidates is performed. An antenna combination having the most outstanding communication performance is selected as antennas to be used for communication from the $_NC_L$ antenna combinations. Such an antenna selecting method will hereinafter be referred to as a "second prior example" for convenience.

In accordance with the second prior example, an optimum antenna combination having the most outstanding communication performance may be selected. However, in the second prior example, when a radio communication apparatus is provided with many antennas, there will also be many antenna combination candidates, thereby increasing a complexity of a calculation process needed to select antennas to be used from the antenna combination candidates, with the result that an extraordinary amount of processing time is needed for the antenna selecting process.

Accordingly, an antenna selecting method needs to be considered that allows the complexity of a calculation process to be decreased and allows a processing time to be decreased even when a radio communication apparatus is provided with many antennas.

Making a communication performance obtained from a selected antenna combination completely different from a communication performance obtained from an optimum antenna combination as a result of enhancing an efficiency of an antenna selecting process in an attempt to limit a processing time and the complexity of a calculation process, eliminates the purpose of increasing the number of antennas to enhance the communication performance.

Accordingly, an antenna selecting method needs to be considered that, while limiting a processing time and the complexity of a calculation process, enables an optimum antenna combination or an antenna combination which achieves a communication performance that approximates a communication performance achieved by the optimum antenna combination to be precisely obtained.

PRIOR ART DOCUMENTS

Patent Documents

Patent document 1: Japanese National Publication of International Patent Application No. 2010-525683
Patent document 2: Japanese Laid-open Patent Publication No. 2010-259049

SUMMARY

According to an aspect of the embodiments, a radio communication apparatus on a reception side communicates with a radio communication apparatus on a transmission side that includes a plurality of transmitting antennas. The radio communication apparatus on the reception side includes a plurality of receiving antennas, an antenna selection processing unit, and a transmitting unit. The antenna selection processing unit is configured to select a transmitting antenna from the plurality of transmitting antennas, generate a set that includes antenna indexes each indicating each of the plurality of transmitting antennas, and rearrange the antenna indexes in the generated set in sequence starting from an antenna index indicating the selected transmitting antenna. The antenna selection processing unit is configured to generate a channel matrix which is composed of as many rows as the plurality of receiving antennas and as many columns as the plurality of transmitting antennas and in which a column corresponding to the selected transmitting antenna is located at a top, and generate a selected-channel matrix composed of the column corresponding to the selected transmitting antenna. The antenna selection processing unit is configured to multiply an inverse matrix of the generated channel matrix by the selected-channel matrix so as to generate an evaluation matrix that includes an identity matrix composed of as many rows as the plurality of receiving antennas and that includes a submatrix that does not include the identity matrix, rearrange the antenna indexes in the set in accordance with values of elements in the evaluation matrix, and select an antenna to be used in accordance with the rearranged antenna indexes of the set. The transmitting unit is configured to transmit, to the radio communication apparatus on the transmission side, an antenna index that indicates the antenna to be used selected by the antenna selection processing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an exemplary process flow of the radio communication system in accordance with the first embodiment;

FIG. 5 illustrates a channel capacity characteristic of an antenna selecting process in accordance with an embodiment;

FIG. 7 illustrates a list in which the amount of calculation of complex numbers in an antenna selecting method in accordance with an embodiment is compared with the amount of calculation of complex numbers in antenna selecting methods of first and second prior examples;

FIG. 8 illustrates a histogram of the necessary number of times an updating process for updating an evaluation matrix is performed until an antenna to be used is selected when transmitting antennas with a high electric power value are selected as initial values of a selected-channel matrix;

FIG. 9 illustrates a histogram of the necessary number of times a process for updating an evaluation matrix is performed until an antenna to be used is selected when arbitrary transmitting antennas are selected as initial values of a selected-channel matrix;

DESCRIPTION OF EMBODIMENTS

Figure 1:
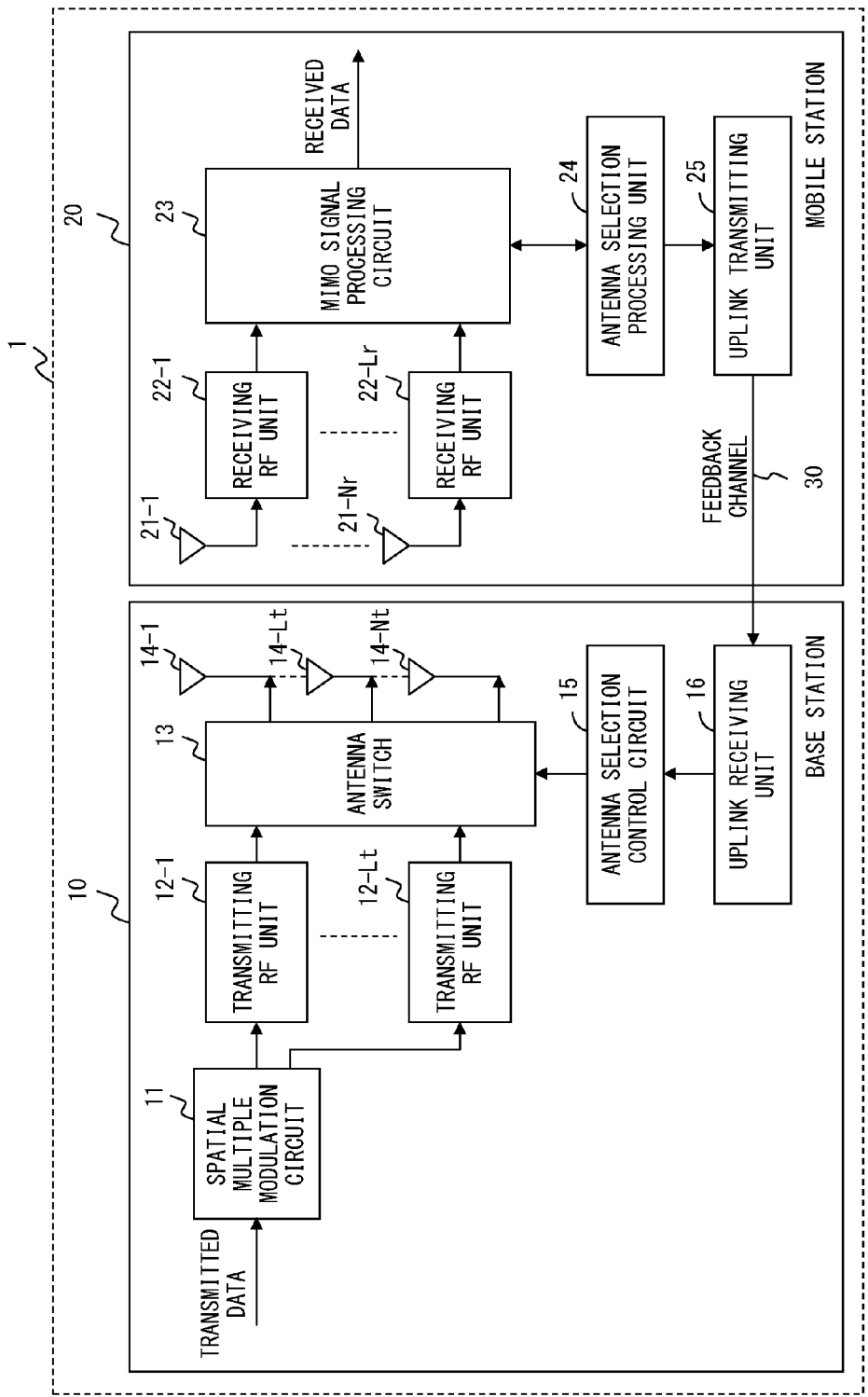
FIG. 1 is a block diagram illustrating a configuration of a radio communication system in accordance with a first embodiment.

In the following, embodiments will be described in detail with reference to the drawings.
[First Embodiment]
FIG. 1 is a block diagram illustrating a configuration of a radio communication system in accordance with a first embodiment.

A radio communication system 1 illustrated in FIG. 1 includes a base station 10 and a mobile station 20, both of which are examples of a radio communication apparatus in accordance with the embodiment and are capable of performing MIMO communication. Although FIG. 1 illustrates one base station 10 and one mobile station 20, the radio communication system 1 may include a plurality of base stations 10 and a plurality of mobile stations 20.

The base station 10 includes a spatial multiple modulation circuit 11, $L_t$ ($L_t$ is an integer that is two or greater) transmitting radio frequency (RF) units 12-1 to 12-$L_t$, an antenna switch 13, $N_t$ ($N_t$ is an integer that is two or greater, and $N_t > L_t$) transmitting antennas 14-1 to 14-$N_t$, an antenna selection control circuit 15, and an uplink receiving unit. The transmitting RF units 12-1 to 12-Lt will hereinafter be referred to as "transmitting units 12" when these units are not distinguished from each other. The transmitting antennas 14-1 to 14-$N_t$ will hereinafter be referred to as "transmitting antennas 14" when these antennas are not distinguished from each other.

In FIG. 1, the base station 10 is depicted as a radio communication apparatus that transmits data to the mobile station 20, i.e., a transmitting apparatus, but the base station 10 may be a radio communication apparatus that receives data from the mobile station 20, i.e., a receiving apparatus. Accordingly, in addition to the components and the functions illustrated in FIG. 1, the base station 10 may include a component and a function for receiving data from the mobile station 20.

The fact that the base station 10 is provided with $L_t$ transmitting RF units 12 means that the base station 10 is capable of simultaneously processing $L_t$ transmitted data streams. The base station 10 selects $L_t$ transmitting antennas 14 from $N_t$ transmitting antennas 14 and transmits data streams using the selected $L_t$ transmitting antennas 14.

The spatial multiple modulation circuit 11 of the base station 10 encodes transmitted data that has been input by adding a predetermined error correcting code to this transmitted data, maps and modulates encoded data series using a predetermined modulation scheme, and outputs L transmitted data streams. A turbo code is an example of the predetermined error correcting code. Examples of the predetermined modulation scheme include, for example, quadrature phase shift keying (QPSK) and 16 quadrature amplitude modulation (QAM). In addition to a signal of a data channel, the spatial multiple modulation circuit 11 applies multiprocessing to, for example, a known signal used for estimating a channel (for calculating a channel matrix) (a pilot signal or a preamble signal) and a signal of a control channel for transmitting control information.

The transmitting RF units 12 apply, to L transmitted data streams, needed radio transmission processes that include, for example, digital-to-analog conversion and frequency conversion (up-conversion) into a radio frequency (RF), and the transmitting RF units 12 output L transmitted RF signals.

Under control of the antenna selection control circuit 15, the antenna switch 13 selects L transmitting antennas 14 to be used for transmission and connects the selected L transmitting antennas 14 to the transmitting RF units 12.

The transmitting antennas 14 radiate the transmitted RF signals received from the transmitting RF units 12 connected via the antenna switch 13 into a space toward the mobile station 20. When the base station 10 also functions as a radio communication apparatus that receives data from the mobile station 20, i.e., a receiving apparatus, the transmitting antennas 14 may also function as receiving antennas that receive data from the mobile station 20.

The antenna selection control circuit 15 controls a connection between the transmitting RF units 12 and the transmitting antennas 14 by controlling the antenna switch 13 in accordance with an antenna index transmitted from the mobile station 20.

An uplink receiving unit 16 receives data from an uplink transmitting unit 25 via a feedback channel 30, which is one of uplink channels provided between the base station 10 and the mobile station 20. An antenna index is an example of data transmitted from the uplink transmitting unit 25.

The mobile station 20 includes $N_r$ ($N_r$ is an integer that is two or greater) receiving antennas 21-1 to 21-$N_r$, $L_r$ ($L_r$ is an integer that is two or greater, and $L_r \leq N_r$) receiving RF units 22-1 to 22-$L_r$, a MIMO signal processing circuit 23, an antenna selection processing unit 24, and an uplink transmitting unit 25. The receiving antennas 21-1 to 21-$N_r$ will hereinafter be referred to as "receiving antennas 21" when these antennas are not distinguished from each other. The receiving RF units 22-1 to 22-$L_r$ will hereinafter be referred to as "receiving RF units 22" when these units are not distinguished from each other.

In FIG. 1, the mobile station 20 is depicted as a radio communication apparatus that receives data from the base station 10, i.e., a receiving apparatus, but the mobile station 20 may be a radio communication apparatus that transmits data to the base station 10, i.e., a transmitting apparatus. Accordingly, in addition to the components and the functions illustrated in FIG. 1, the mobile station 20 may include a component and a function for transmitting data to the base station 10.

The fact that the mobile station 20 is provided with $L_r$ receiving RF units 22 means that the mobile station 20 is capable of simultaneously processing $L_r$ received data streams.

In the following, descriptions will be given of an exemplary embodiment in which $N_r$, the number of receiving antennas 21, is the same as $L_r$, the number of transmitted data streams, and in which the mobile station 20 receives data streams using all of the $N_r$ receiving antennas 21. In addition, descriptions are based on the assumption that both the number of received data streams $L_r$ and the number of transmitted data streams $L_t$ are L. Such assumptions are for the sake of description of one exemplary embodiment, and it should be noted that embodiments are not limited to being based on these assumptions.

The receiving antennas 21 receive RF signals transmitted from the transmitting antennas 14 of the base station 10. When the mobile station 20 also functions as a radio communication apparatus that transmits data to the base station 10, i.e., a transmitting apparatus, the receiving antennas 21 may also function as transmitting antennas that transmit data to the base station 10.

The receiving RF units 22 apply, to the RF signals received by the receiving antennas 21, needed radio receiving processes that include, for example, frequency conversion (down-conversion) into a baseband frequency and analog-to-digital conversion.

The MIMO signal processing circuit 23 separates, for each transmitted data stream, the received signals (digital baseband signals) processed by the receiving RF units 22, i.e., spatial-multiplexed received signals, and the MIMO signal processing circuit 23 demodulates and decodes the separated received signals, thereby outputting the received data. In the separating process performed by the MIMO signal processing circuit 23, an inverse matrix of a channel matrix is used to perform zero forcing (ZF) linear decoding. The separating process may be performed via minimum mean square error (MMSE) decoding.

The Channel matrix represents the state of channels between the transmitting antennas 14 and the receiving antennas 21. As an example, the mobile station 20 calculates the channel matrix by computing a correlation between a pilot signal (or a preamble signal) received from the base station 10 and a known pilot signal (a pilot replica).

In the following descriptions, unless otherwise specified, a channel matrix H indicates an $N_r \times N_t$ matrix that represents the state of channels between $N_t$ transmitting antennas 14 and $N_r$ receiving antennas 21.

A channel matrix $H_p$ indicates an $N_r \times L$ matrix that represents the state of channels between $N_r$ receiving antennas 21 and selected L transmitting antennas 14 that correspond to a subset p of the receiving antennas 14. The subset p is one combination of L transmitting antennas 14 selected from $N_t$ transmitting antennas 14, and p∈P is satisfied, where P indicates a set of all of the possible combinations of the transmitting antennas 14.

Received signals $y_i$ (i=1, 2, . . . , $N_r$) corresponding to the receiving antennas 21-1 to 21-$N_r$ are input from the receiving RF units 22 to the MIMO signal processing circuit 23. In this case, a relationship between a received signal y and a transmitted signal s is expressed by the following formula, (1), using a channel matrix.

$$y = \sqrt{\frac{E_s}{L}} H_p s + w \qquad (1)$$

In this formula, y indicates a received-signal vector of $N_r \times 1$, and s indicates a transmitted-signal (transmitted data stream) vector of $L \times 1$. w indicates a noise vector of $N_r \times 1$, and Es indicates a total electric power transmitted by L transmitting antennas 14 at each point in time.

As indicated by the following formula, (2), the MIMO signal processing circuit 23 applies a filter matrix G with a size of $L \times N_r$ to the received signal y, thereby obtaining an estimate value s' of the received signal s. The MIMO signal processing circuit 23 outputs received data by demodulating and decoding the obtained signal s'.

$$s' = Gy = \sqrt{\frac{E_s}{L}} GH_p s + Gw \qquad (2)$$

As indicated by the following formula, (3), the filter matrix G is expressed using the channel matrix $H_p$.

$$G = (H_p^H H_p + \delta \gamma I_L)^{-1} H_p^H \qquad (3)$$

In this formula, $I_L$ indicates an $L \times L$ identity matrix, and "$[\ ]^H$" indicates conjugate transpose. $\gamma = L/\rho$ is satisfied, where $\rho$ indicates an average signal-to-noise ratio (SNR) for the receiving antennas 21-1 to 21-$N_r$. In ZF linear decoding, the filter matrix G with $\delta=0$ being substituted in formula (3) is used. In MMSE decoding, the filter matrix G with $\delta=1$ being substituted in formula (3) is used.

The antenna selection processing unit 24 is a processor that selects L transmitting antennas 14 used for communication in accordance with an antenna selecting method in accordance with an embodiment.

In an embodiment, the antenna selection processing unit 24 selects L transmitting antennas 14 used for communication in accordance with a criterion of maximizing a channel capacity. In the following, descriptions will be given of basic policies of an antenna selecting method used by the antenna selection processing unit 24 in accordance with an embodiment.

In a MIMO radio communication system that includes $N_t$ transmitting antennas 14 and $N_r$ receiving antennas 21 ($N_t \geq N_r$) as illustrated in FIG. 1, a channel capacity C is expressed by the following formula, (4).

$$C = \log_2 \det\left(I_{Nr} + \frac{\rho}{N_t} H H^H\right) \qquad (4)$$

In this formula, $I_{NR}$ indicates an $N_r \times N_r$ identity matrix.

When L ($L = N_r$) transmitting antennas are selected from $N_t$ transmitting antennas, a channel capacity $C_p$ after the antenna selecting is expressed by the following formula, (5).

$$C_p = \log_2 \det\left(I_L + \frac{\rho}{L} H_p H_p^H\right) \qquad (5)$$

Selecting L transmitting antennas 14 to be used for communication in accordance with the criterion of maximizing channel capacity is equal to detecting the channel matrix $H_p$ that maximizes the channel capacity $C_p$ after antenna selecting. That is, a channel matrix $H_{opt}$ is expressed by the following formula, (6), where $H_{opt}$ indicates the channel matrix $H_p$ that maximizes the channel capacity $C_p$ after channel selecting.

$$H_{opt} = \underset{p \in P}{\arg\max}\ C_p = \underset{p \in P}{\arg\max}\ \log_2 \det\left(I_L + \frac{\rho}{L} H_p H_p^H\right) \qquad (6)$$

Assuming that $\rho$ that is an average SNR for the $N_r$ receiving antennas 21 is a high value, formula (6) may be expressed as indicated by the following formula, (7).

$$H_{opt} = \underset{p \in P}{\arg\max}\ \det(H_p H_p^H) = \underset{p \in P}{\arg\max}\ |\det(H_p)|^2 \qquad (7)$$

Accordingly, by detecting the maximum value of the absolute value of a determinant of the channel matrix $H_p$, the antenna selection processing unit 24 selects the combination of transmitting channels that maximizes the channel capacity $C_p$.

The uplink transmitting unit 25 transmits information to the uplink receiving unit 16 via the feedback channel 30 that is an uplink channel provided between the base station 10 and the mobile station 20. An antenna index that indicates L transmitting antennas 14 selected by the antenna selection processing unit 24 is an example of information transmitted from the uplink transmitting unit 25.

An exemplary process flow of the radio communication system 1 will be described with reference to FIG. 2.

FIG. 2 illustrates an exemplary process flow of the radio communication system in accordance with the first embodiment.

As illustrated in FIG. 2, in step S11, the base station 10 transmits, to the mobile station 20, pieces of information relating to the number of transmitting antennas 14 and a processing capacity for processing data streams, and the mobile station 20 receives these pieces of information transmitted from the base station 10. The mobile station 20 recognizes, for example, the number of transmitting antennas 14 and the processing capacity of the base station 10, a communications partner of the mobile station 20.

In step S21, the mobile station 20 transmits, to the base station 10, pieces of information relating to the number of receiving antennas 21 and a processing capacity for processing data streams, and the base station 10 receives these pieces of information transmitted from the mobile station 20. The base station 10 recognizes, for example, the number of receiving antennas 21 and the processing capacity of the mobile station 20, a communications partner of the base station 10.

In step S12, the base station 10 transmits a pilot signal to the mobile station 20. In step S22, the mobile station 20 receives the pilot signal transmitted from the base station 10, and the MIMO signal processing circuit 23 of the mobile station 20 estimates a channel matrix H by computing a correlation between the received pilot signal and a pilot replica.

In step S23, in accordance with a processing procedure that conforms to an embodiment, the antenna selection processing unit 24 of the mobile station 20 selects a subset p of L transmitting antennas 14 that satisfy a predetermined antenna selecting criterion of maximizing the channel capacity.

Details of the processing procedure in step S23 in accordance with an embodiment will be described hereinafter.

In step S24, the uplink transmitting unit 25 of the mobile station 20 transmits the antenna index that indicates L transmitting antennas 14 selected by the antenna selection processing unit 24 to the base station 10 via the feedback channel 30. In step S13, the uplink receiving unit 16 of the base station 10 receives the antenna index transmitted from the mobile station 20 via the feedback channel 30.

In step S14, the antenna selection control circuit 15 of the base station 10 controls the antenna switch 13 in accordance with the antenna index received by the uplink receiving unit 16. Under the control of the antenna selection control circuit 15, the antenna switch 13 connects the transmitting RF units 12 to the transmitting antennas 14.

In step S15, the base station 10 transmits transmitted data streams via the transmitting antennas 14 connected by the antenna switch 14. In step S25, the mobile station 20 receives the transmitted data streams transmitted from the base station 10 via the receiving antennas 21.

Descriptions will be given of a process of step S23 in FIG. 2 wherein the antenna selection processing unit 24 selects a subset p of L transmitting antennas 14 that is used to transmit transmitted data streams.

First, a first example of an antenna selecting process in accordance with an embodiment will be described with reference to FIG. 3.

Figure 3:
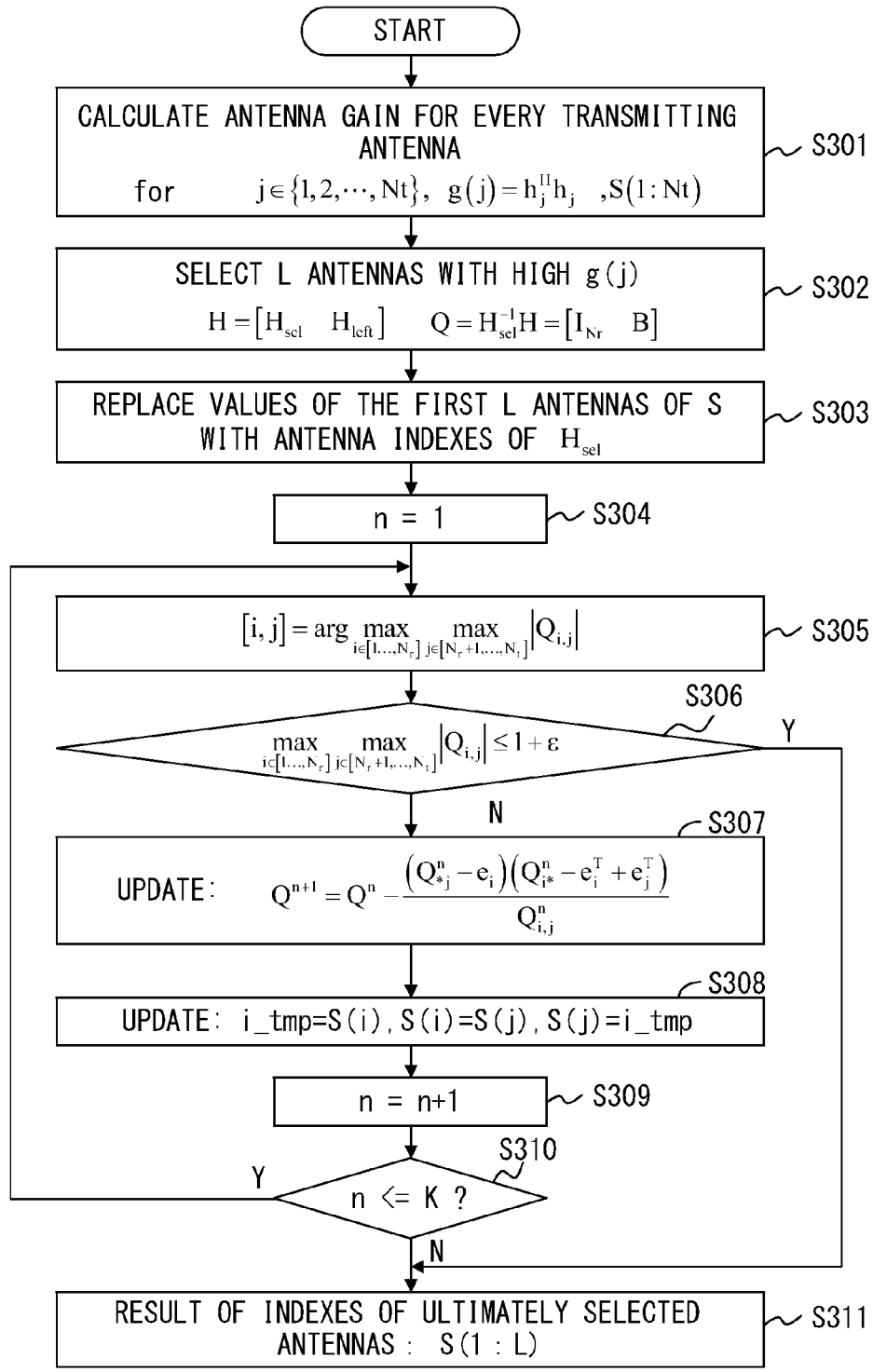
FIG. 3 is a selecting process flow diagram illustrating a first example of an antenna selecting process in accordance with an embodiment.

FIG. 3 is a selecting process flow diagram illustrating the first example of an antenna selecting process in accordance with an embodiment.

In step S301, using the following formula, (8), the antenna selection processing unit 24 calculates an electric power value g(j) for each transmitting antenna 14-j (j∈1,2, ..., $N_t$) of the transmitting antennas 14.

$$g(j) = h_j^H h_j + \gamma \quad (8)$$

$h_j$ indicates a vector of $N_r \times 1$ that indicates a column j of the channel matrix H.

As described above, assuming that ρ that is an average SNR for the $N_r$ receiving antennas 21 is a high value, a constant γ in formula (8) is 0.

The antenna selection processing unit 24 sets, to a set S of the transmitting antennas, index values 1 to $N_t$ of the transmitting antennas 14 each corresponding to a column of the channel matrix H composed of N columns (j=1 to $N_t$).

In step S302, the antenna selection processing unit 24 selects L transmitting antennas 14 in descending order of electric power value g(j). It is highly likely that the transmitting antennas 14 selected in descending order of electric power value will be included in the subset p of L transmitting antennas 14 ultimately selected as antennas that satisfy the antenna selecting criterion of maximizing the channel capacity.

Let a channel matrix corresponding to the selected L transmitting antennas be a selected-channel matrix $H_{sel}$. Let a channel matrix corresponding to not-selected $N_t$-L transmitting antennas be a not-selected-channel matrix $H_{left}$. The selected-channel matrix $H_{sel}$ and the not-selected-channel matrix $H_{left}$ are submatrixes of the channel matrix H.

The antenna selection processing unit 24 rearranges columns of the channel matrix H so as to generate the selected-channel matrix $H_{sel}$, which includes first to L-th columns from the left side of the channel matrix H, and the not-selected-channel matrix $H_{left}$, which includes (L+1)-th to $N_t$-th columns. The channel matrix H rearranged by the antenna selection processing unit 24 is expressed by the following formula, (9).

$$H = [H_{sel} H_{left}] \quad (9)$$

In step S302, the antenna selection processing unit 24 further calculates an evaluation matrix Q in accordance with the following formula, (10).

$$Q = H_{sel}^{-1} H = [I_{N_r} B] \quad (10)$$

B is a submatrix of the evaluation matrix Q and is expressed by the following formula, (11).

$$B = H_{sel}^{-1} H_{left} \quad (11)$$

In step S303, the antenna selection processing unit 24 rearranges the set S of transmitting antennas in accordance with the index values of the selected L transmitting antennas 14. That is, the antenna selection processing unit 24 replaces the first to L-th index values of the transmitting antennas of the set S of transmitting antennas with the index values of the transmitting antennas 14 that form columns of the selected-channel matrix $H_{sel}$.

In step S304, 1 is set as a count value n.

In step S305, the antenna selection processing unit 24 acquires an element with the maximum absolute value from among elements of the evaluation matrix Q, which is composed of $N_r$ rows and $N_t$ columns, and the antenna selection processing unit 24 obtains a row number i and a column number j of the element with the maximum value.

In step S306, the antenna selection processing unit 24 determines whether or not the absolute value of the acquired element is higher than 1. Depending on an embodiment, to enhance a processing speed of the antenna selecting process, the antenna selection processing unit 24 determines whether or not the absolute value of the acquired element is higher than 1+ϵ (ϵ is an arbitrary positive value that is lower than 1, e.g., 0.01).

When the result of the determination in step S306 indicates that the absolute value of the acquired element is higher than 1 ("N" in step S306), the antenna selection processing unit 24 proceeds to step S307. Depending on an embodiment, when the absolute value of the acquired element is higher than 1+ϵ ("N" in step S306) (ϵ is an arbitrary positive value that is lower than 1, e.g., 0.01), the antenna selection processing unit 24 proceeds to step S307.

Meanwhile, when the result of the determination in step S306 indicates that the absolute value of the acquired element is equal to or lower than 1 ("Y" in step S306), the antenna selection processing unit 24 proceeds to step S311. Depending on an embodiment, when the absolute value of the acquired element is equal to or lower than 1+ϵ ("Y" in step S306), the antenna selection processing unit 24 proceeds to step S311.

In step S307, using the row number i and the column number j obtained in step S305, the antenna selection processing unit 24 performs an updating process for updating the evaluation matrix Q. The updating process for updating the evaluation matrix Q performed by the antenna selection processing unit 24 is performed in accordance with the following formula, (12).

$$Q^{n+1} = Q^n - \frac{(Q_{*j}^n - e_i)(Q_{i*}^n - e_i^T + e_j^T)}{Q_{i,j}^n} \quad (12)$$

$e_i$ represents an i-th column of the identity matrix I, and $e_j$ represents a j-th column of the identity matrix I. "$[\;]^T$" means transposition, and "[ ]$^{-1}$" means an inverse matrix. When A is a matrix, [A]$_{ij}$ indicates an element at an i-th row and a j-th column of the matrix A. A$_{i*}$ indicates the i-th row of the matrix A, and A$_{*j}$ indicates the j-th column of the matrix A.

In step S308, using the row number i and the column number j obtained in step S305, the antenna selection processing unit 24 replaces an i-th index value with a j-th index value of the set S of transmitting antennas.

In step S309, the antenna selection processing unit 24 increments the count value n by one.

In step S310, the antenna selection processing unit 24 determines whether or not the count value n is equal to or lower than a looped-process maximum value K (K=N$_t$−1).

When the result of the determination in step S310 indicates that the count value n is equal to or lower than the loop maximum value K ("Y" in step S310), the antenna selection processing unit 24 returns to step S305 and continues the processes.

Meanwhile, when the result of the determination in step S310 indicates that the count value n exceeds the loop maximum value K ("N" in step S310), the antenna selection processing unit 24 proceeds to step S311.

In step S311, the antenna selection processing unit 24 obtains the first to L-th index values of the transmitting antennas 14 of the set S of transmitting antennas as the index values of ultimately selected transmitting antennas 14. That is, the antenna selection processing unit 24 obtains the subset p of transmitting antennas 14 that conforms to the antenna selecting criterion of maximizing the channel capacity $C_p$.

The first example of the antenna selecting process which has been described with reference to FIG. 3 will be further described using a specific example so that this example can be better understood.

As an example, assume that the radio communication system 1 includes five transmitting antennas 14-1 to 14-5 and three receiving antennas 21-1 to 21-3. Also assume that, under this condition, the antenna selection processing unit 24 selects three transmitting antennas 14 from the five transmitting antennas 14-1 to 14-5 in accordance with the first example of the antenna selecting process.

When there are five transmitting antennas 14 and three receiving antennas 21, the channel matrix H becomes a 3×5 matrix as indicated by the following formula, (13).

$$H = \begin{bmatrix} h11 & h12 & h13 & h14 & h15 \\ h21 & h22 & h23 & h24 & h25 \\ h31 & h32 & h33 & h34 & h35 \end{bmatrix} \quad (13)$$

Column numbers of the channel matrix indicated by formula (13) correspond to index values of the transmitting antennas 14.

In step S301, an electric power value g(j) is calculated for each transmitting antenna 14-j (j∈1,2,...,5).
The index values "1" to "5" of the transmitting antennas 14 are set to the set S of transmitting antennas.

In step S302, the antenna selection processing unit 24 selects three transmitting antennas 14 in descending order of electric power value g(j). As an example, assume that the transmitting antennas 14-1 to 14-3 are selected. In this case, a selected-channel matrix H$_{sel}$ and not-selected-channel matrix H$_{left}$ are expressed by formulae (14) and (15), respectively.

$$H_{sel} = \begin{bmatrix} h11 & h12 & h13 \\ h21 & h22 & h23 \\ h31 & h32 & h33 \end{bmatrix} \quad (14)$$

$$H_{left} = \begin{bmatrix} h14 & h15 \\ h24 & h25 \\ h34 & h35 \end{bmatrix} \quad (15)$$

An evaluation matrix Q calculated in accordance with formula (10) is represented as, for example, a 3×5 matrix as expressed by the following formula, (16).

$$Q = H_{sel}^{-1} H = [I_3 B] = \begin{bmatrix} 1 & 0 & 0 & q14 & q15 \\ 0 & 1 & 0 & q24 & q25 \\ 0 & 0 & 1 & q34 & q35 \end{bmatrix} \quad (16)$$

The first to third columns from the left side of the evaluation matrix Q expressed by formula (16) form an identity matrix I, and the forth to fifth columns form a submatrix B of the evaluation matrix Q.

In step S303, the set S of transmitting antennas are rearranged, and the index values "1", "2" and "3" of the transmitting antennas are set to the first to third values of the set S of transmitting antennas.

After "1" is set in step S304 as the count value n, in step S305, an element with the maximum absolute value is acquired from among elements q14, q24, q34, q15, q25 and q35 of the submatrix B of the evaluation matrix Q expressed by formula (16), and a row number i and a column number j of the element with the maximum absolute value are obtained. As an example, assume that |q15|, the absolute value of the element q15, is the largest among the absolute values of the elements q14, q24, q34, q15, q25 and q35. In this case, the row number "1" and the column number "5" of the element q15 are obtained.

As an example, when it is determined in step S306 that the absolute value |q15| of the element q15 is larger than 1, the elements at the first column of the evaluation matrix Q are replaced with the elements at the fifth column. The evaluation matrix Q after the replacing is expressed by, for example, the following formula, (17).

$$Q = \begin{bmatrix} q15 & 0 & 0 & q14 & 1 \\ q25 & 1 & 0 & q24 & 0 \\ q35 & 0 & 1 & q34 & 0 \end{bmatrix} \quad (17)$$

The absolute value of a 3×3 determinant of the left three columns of the evaluation matrix Q before the element replacing expressed by formula (16) is 1. Meanwhile, the absolute value of a 3×3 determinant of the left three columns of the evaluation matrix Q after the element replacing expressed by formula (17) is higher than 1. This indicates that a channel capacity $C_p$ represented by 3×3 of the left three columns of the evaluation matrix Q before the element replacing expressed by formula (16) is not the maximum channel capacity.

Accordingly, in an embodiment, as described above, elements in the evaluation matrix Q are replaced to increase the channel capacity $C_p$ represented by 3×3 of the left three columns of the evaluation matrix Q, thereby selecting transmitting antennas 14 having a greater channel capacity $C_p$.

When the elements at the first column of the evaluation matrix Q are replaced with the elements at the fifth column, the channel matrix H is expressed by the following formula, (18).

$$H = \begin{bmatrix} h15 & h12 & h13 & h14 & h11 \\ h25 & h22 & h23 & h24 & h21 \\ h35 & h32 & h33 & h34 & h31 \end{bmatrix} \quad (18)$$

After the element replacing, the selected-channel matrix $H_{sel}$ and the not-selected-channel matrix $H_{left}$ are expressed by the following formulae, (19) and (20), respectively.

$$H_{sel} = \begin{bmatrix} h15 & h12 & h13 \\ h25 & h22 & h23 \\ h35 & h32 & h33 \end{bmatrix} \quad (19)$$

$$H_{left} = \begin{bmatrix} h14 & h11 \\ h24 & h21 \\ h34 & h31 \end{bmatrix} \quad (20)$$

In step S306, a new evaluation matrix Q is calculated for the channel matrix H for which elements have been replaced as expressed by formula (18). The new evaluation matrix is expressed by the following formula, (21).

$$Q = H_{sel}^{-1} H = [I_3 B] = \begin{bmatrix} 1 & 0 & 0 & q14' & q15' \\ 0 & 1 & 0 & q24' & q25' \\ 0 & 0 & 1 & q34' & q35' \end{bmatrix} \quad (21)$$

Elements q14', q24', q34', q15', q25' and q35' in formula (21) indicate elements of the new evaluation matrix Q, and these elements are also elements of a submatrix B of the new evaluation matrix Q.

When the new evaluation matrix Q is directly computed as expressed by formula (21) using the selected-channel matrix $H_{sel}$ after element replacing expressed by formula (19) and the channel H after element replacing expressed by formula (18), a process for calculating complex numbers needs to be performed a huge number of times. As a result, a complexity of the transmitting antenna selecting process increases, thereby requiring a long processing time.

Accordingly, in an embodiment, in step S307, the new evaluation matrix Q for the channel matrix H after element replacing is calculated using the update formula for updating the evaluation matrix Q which is expressed by formula (12).

The update formula for updating the evaluation matrix Q which is expressed by formula (12) may be derived according to the following rationale.

The column i and the column j of the channel matrix H may be replaced via the rank-one updating expressed by the following formula, (22).

$$H^{n+1} = H^n + (H_{*j}^n - H_{*i}^n)e_i^T + (H_{*i}^n - H_{*j}^n)e_j^T \quad (22)$$
$$= H^n + (H_{*j}^n - H_{*i}^n)(e_i^T - e_j^T)$$
$$= H^n + v^n d^T$$

$v^n$ and d in formula (22) are expressed by the following formulae, (23) and (24).

$$v^n = H_{*j}^n - H_{*i}^n \quad (23)$$

$$d = e_i - e_j \quad (24)$$

The selected-channel matrix $H_{sel}$ and the not-selected-channel matrix $H_{left}$, both of which are submatrixes of the channel matrix H, are respectively updated as expressed by the following formulae, (25) and (26).

$$H_{sel}^{n+1} = H_{sel}^n + (H_{*j}^n - H_{*i}^n)e_i^T = H_{sel}^n + v^n e_i^T \quad (25)$$

$$H_{left}^{n+1} = H_{left}^n + (H_{*i}^n - H_{*j}^n)e_{j-L}^T = H_{left}^n - v^n e_{j-L}^T \quad (26)$$

A Sherman-Morrison formula is expressed by the following formula, (27).

$$(A + bc^T)^{-1} = A^{-1} - A^{-1}bc^T A^{-1}/(1 + c^T A^{-1} b) \quad (27)$$

Using formula (27), the following formula, (28), which is an update formula for updating an inverse matrix of the selected-channel matrix $H_{sel}$ expressed by formula (25), is obtained.

$$(H_{sel}^{n+1})^{-1} = (H_{sel}^n)^{-1} - (H_{sel}^n)^{-1} v^n e_i^T (H_{sel}^n)^{-1}/(1 + e_i^T (H_{sel}^n)^{-1} v^n) \quad (28)$$

The denominator of the fraction of formula (28) is expressed by the following formula, (29).

$$1 + e_i^T (H_{sel}^n)^{-1} v^n = 1 + e_i^T (Q_{*j}^n - Q_{*i}^n) = 1 + Q_{i,j}^n - Q_{i,i}^n = Q_{i,j}^n \quad (29)$$

Using formulae (22) and (28), the following formula, (30), which is an update formula for updating the evaluation matrix Q, is obtained.

$$Q = (H_{sel}^{n+1})^{-1} H^{n+1} = Q^n + (H_{sel}^n)^{-1} v^n (d^T Q_{i,j}^n - e_i^T Q^n - e_i^T (H_{sel}^n)^{-1} v^n d^T)/Q_{i,j}^n \quad (30)$$

The following formulae, (31) and (32), also hold.

$$(H_{sel}^n)^{-1} v^n = (H_{sel}^n)^{-1}(H_{*j}^n - H_{*i}^n) = Q_{*j}^n - Q_{*i}^n = Q_{*j}^n - e_i \quad (31)$$

$$e_i^T (H_{sel}^n)^{-1} v^n = e_i^T (Q_{*j}^n - Q_{*i}^n) = Q_{i,j}^n - Q_{i,i}^n = Q_{i,j}^n - 1 \quad (32)$$

Accordingly, substituting formulae (31) and (32) in formula (30) obtains the update formula for updating the evaluation matrix Q which is expressed by formula (12).

Calculating a new evaluation matrix Q using the update formula for updating the evaluation matrix Q which is expressed by formula (12) may decrease the number of times a process for computing complex numbers is performed, thereby allowing a complexity of the antenna selecting process to be decreased, with the result that the time needed for the antenna selecting process may be shortened.

In step S308, the first index value of the set S of transmitting antennas 14 is replaced with the fifth index value.

In step S309, the count value n is incremented by one. The looped antenna selecting process illustrated in FIG. 3 is continued until the incremented count value n exceeds the looped-process maximum value K ("N" in step S310) or until the maximum value of the absolute values of the elements of the submatrix B of the evaluation matrix Q becomes one or lower ("Y" in step S306).

When the incremented count value n exceeds the looped-process maximum value K ("N" in step S310) or when the maximum value of the absolute values of the elements of the submatrix B of the evaluation matrix Q becomes one or lower ("Y" in step S306), a process of step S311 is performed. That is, in this specific example, a subset p of transmitting antennas, the combination of three transmitting antennas 14 with the channel capacity $C_p$ that is the greatest, is obtained.

Next, descriptions will be given of a second example of an antenna selecting process in accordance with an embodiment.

In the first example of the antenna selecting process described with reference to FIG. 3, the antenna selection processing unit 24 performs the process for selecting transmitting antennas using the update formula for updating the evaluation matrix Q which is expressed by formula (12). By contrast, in the second example of the antenna selecting process, the antenna selection processing unit 24 performs a process for selecting transmitting antennas using an update formula for updating the submatrix B of the evaluation matrix Q.

Using formulae (11), (26) and (28), the following formula, (33), which is an update formula for updating the submatrix B of the evaluation matrix Q, is obtained.

$$\begin{aligned} B^{n+1} &= (H_{sel}^{n+1})^{-1} H_{left}^{n+1} \\ &= B^n - (Q_{*,j}^n - e_i)(e_{j-L}^T Q_{i,j}^n + e_i^T B^n - \\ &\quad (Q_{i,j}^n - 1)e_{j-L}^T)/Q_{i,j}^n \\ &= B^n - (B_{*,(j-L)}^n - e_i)(B_{i*}^n + e_{j-L}^T)/B_{i,(j-L)}^n \\ &= B^n - (B_{*,j0}^n - e_{i0})(B_{i0*}^n + e_{j0}^T)/B_{i0,j0}^n \end{aligned} \quad (33)$$

i0 and j0 indicate the i0-th row and the j0-th row of the submatrix B, respectively.

When the update formula for updating the submatrix B of the evaluation matrix Q which is expressed by formula (33) is used, the submatrix B of the new evaluation matrix Q as represented by the elements q14', q24', q34', q15', q25' and q35' in formula (21) do not need to be directly computed and determined. That is, calculating a new submatrix B using the update formula for updating a submatrix B which is expressed by formula (33) may decrease the number of times the process for computing complex numbers is performed. Accordingly, complexity of the antenna selecting process may be decreased, and the time needed for the antenna selecting process may be shortened.

Figure 4:
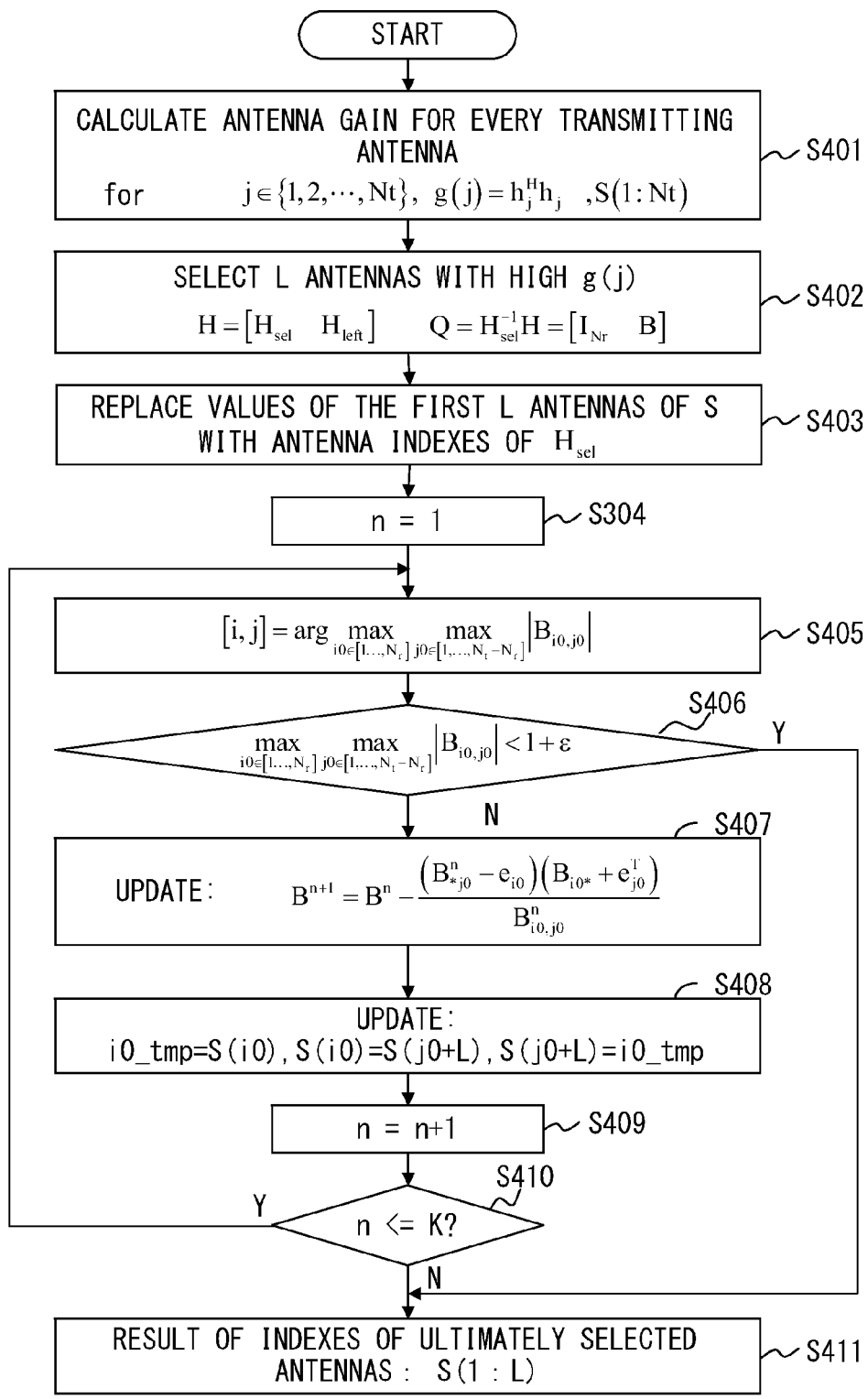
FIG. 4 is a selecting process flow diagram illustrating a second example of an antenna selecting process in accordance with an embodiment.

FIG. 4 is a selecting process flow diagram illustrating the second example of the antenna selecting process in accordance with an embodiment.

In step S401, using formula (8), the antenna selection processing unit 24 calculates an electric power value g (j) for each transmitting antenna 14-j (j∈1,2, . . . ,$N_t$).
Assuming that ρ, an average SNR for Nr receiving antennas 21, is a high value, the constant γ in formula (8) is 0.

The antenna selection processing unit 24 sets, to a set S of transmitting antennas, index values 1 to $N_t$ of the transmitting antennas 14 each corresponding to a column of the channel matrix H composed of N columns (j=1 to $N_t$).

In step S402, the antenna selection processing unit 24 selects L transmitting antennas 14 in descending order of electric power value g(j). The antenna selection processing unit 24 then rearranges columns of the channel matrix H and generates a selected-channel matrix $H_{sel}$, which corresponds to the selected L transmitting antennas 14 at the first to L-th columns from the left side of the channel matrix H, and a not-selected-channel matrix $H_{left}$, which corresponds to not-selected transmitting antennas 14 at the (L+1)-th to $N_t$-th columns.

The antenna selection processing unit 24 calculates a submatrix B of an evaluation matrix Q in accordance with formula (11). The submatrix B is composed of $N_r$ rows, i.e., rows with row numbers i0 that are "1" to "$N_r$", and ($N_t - N_r$) columns, i.e., columns with column numbers j0 that are "1" to "$N_t - N_r$".

In step S403, the antenna selection processing unit 24 rearranges the set S of transmitting antennas 14 in accordance with the index values of the selected L transmitting antennas 14. That is, the antenna selection processing unit 24 replaces the index values of the first to L-th transmitting antennas 14 of the set S of transmitting antennas with the index values of the transmitting antennas 14 that form columns of the selected-channel matrix $H_{sel}$.

In step S404, 1 is set as a count value n.

In step S405, the antenna selection processing unit 24 acquires an element having the maximum absolute value from among elements of the submatrix B and obtains the row number i0 and the column number j0 of the element having the maximum value.

In step S406, the antenna selection processing unit 24 determines whether or not the absolute value of the acquired element is higher than 1. Depending on an embodiment, to enhance the processing speed of the antenna selecting process, the antenna selection processing unit 24 determines whether or not the absolute value of the acquired element is higher than 1+ε (ε is an arbitrary positive value that is lower than 1, e.g., 0.01).

When the result of the determination in step S406 indicates that the absolute value of the acquired element is higher than 1 ("N" in step S406), the antenna selection processing unit 24 proceeds to step S407. Depending on an embodiment, when the absolute value of the acquired element is higher than 1+ε ("N" in step S406) (ε is an arbitrary positive value that is lower than 1, e.g., 0.01), the antenna selection processing unit 24 proceeds to step S407.

Meanwhile, when the result of the determination in step S406 indicates that the absolute value of the acquired element is equal to or lower than 1 ("Y" in step 406), the antenna selection processing unit 24 proceeds to step S411. Depending on an embodiment, when the absolute value of the acquired element is equal to or lower than 1+ε ("Y" in step S406), the antenna selection processing unit 24 proceeds to step S411.

In step S407, using the row number i0 and the column number j0 obtained in step S405, the antenna selection processing unit 24 performs an updating process for updating the submatrix B of the evaluation matrix Q. The updating process for updating the submatrix B performed by the antenna selection processing unit 24 is performed in accordance with the aforementioned formula (33).

In step S408, using the row number i0 and the column number j0 obtained in step S405, the antenna selection processing unit 24 replaces an i0-th index value with a (j0+L)-th index value of a set S of transmitting antenna indexes.

In step S409, the antenna selection processing unit 24 increments the count value n by one.

In step S410, the antenna selection processing unit 24 determines whether or not the count value n is equal to or lower than a looped-process maximum value K (K=$N_t$−1).

When the result of the determination in step S410 indicates that the count value n is equal to or lower than the loop maximum value K ("Y" in step S410), the antenna selection processing unit 24 returns to step S405 and continues the processes.

Meanwhile, when the result of the determination in step S410 indicates that the count value n exceeds the loop maximum value K ("N" in step S410), the antenna selection processing unit 24 proceeds to step S411.

In step S411, the antenna selection processing unit 24 obtains the index values of the first to L-th transmitting antennas 14 of the set S of transmitting antennas 14 as the index values of ultimately selected transmitting antennas 14. That is, the antenna selection processing unit 24 obtains the subset p of transmitting antennas 14 that conforms to the antenna selecting criterion of maximizing the channel capacity $C_p$.

In this way, in the second example of the antenna selecting process, the antenna selection processing unit 24 performs the process for selecting a transmitting antenna using the update formula for updating the submatrix B of the evaluation matrix Q so that the number of times the process for computing complex numbers is performed may be decreased. Accordingly, the complexity of the antenna selecting process may be decreased, and the time needed for the antenna selecting process may be shortened.

Figure 6:
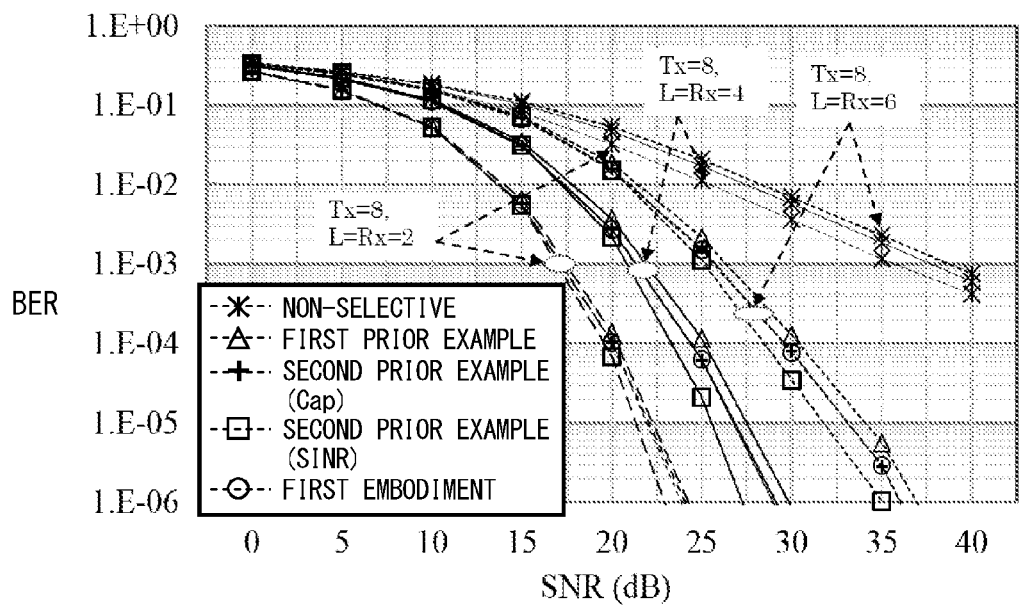
FIG. 6 illustrates a bit error rate characteristic of an antenna selecting process in accordance with an embodiment.

FIG. 5 and FIG. 6 illustrate exemplary results of analyzing in a simulation a communication performance obtained using transmitting antennas 14 selected in accordance with the antenna selecting process in accordance with the first embodiment.

FIG. 5 illustrates a channel capacity characteristic of an antenna selecting process in accordance with an embodiment.

In FIG. 5, the horizontal axis indicates a signal-to-noise ratio (SNR) and the vertical axis indicates a channel capacity.

In FIG. 5, "o" indicates simulation results obtained from transmitting antennas 14 selected using the antenna selecting method in accordance with the embodiments described with reference to FIG. 3 and FIG. 4. "*" indicates simulation results obtained from L transmitting antennas randomly selected from a plurality of transmitting antennas 14. "Δ" indicates simulation results obtained from transmitting antennas 14 selected in accordance with the first prior example described above. "+" indicates simulation results obtained from transmitting antennas 14 of the optimum combination which is selected in accordance with the second prior example described above and which may maximize the channel capacity. FIG. 5 illustrates a simulation result of the antenna selecting method in a situation in which the number of transmitting antennas 14 ($T_x$) provided at the base station 10 is eight and both the number of receiving antennas 21 ($R_x$) provided at the mobile station 20 and the number of used antennas (L) are six, four or two.

As illustrated in FIG. 5, the channel capacity characteristic of the antenna selecting method in accordance with the embodiment is almost identical with the channel capacity characteristic of the second prior example in which the optimum combination for maximizing the channel capacity is selected.

Accordingly, using the antenna selecting method in accordance with the embodiment, an antenna combination for maximizing a channel capacity may be precisely selected.

FIG. 6 illustrates a bit error rate characteristic of an antenna selecting process in accordance with an embodiment. In FIG. 6, the horizontal axis indicates a signal-to-noise ratio (SNR) and the vertical axis indicates a bit error rate (BER). FIG. 6 also illustrates simulation results under a condition in which a modulation scheme used by the spatial multiple modulation circuit 11 and the MIMO signal processing circuit 23 is 16QAM.

In FIG. 6, the meanings of "o", "*", "Δ", and "+" are the same as those in FIG. 5. "□" indicates simulation results obtained from transmitting antennas 14 of the optimum combination which is selected in accordance with the second prior example described above and which may minimize the bit error rate. FIG. 6 illustrates a simulation result of the antenna selecting method in a situation in which the number of transmitting antennas 14 ($T_x$) provided at the base station 10 is eight and both the number of receiving antennas 21 ($R_x$) provided at the mobile station 20 and the number of used antennas (L) are six, four or two.

As illustrated in FIG. 6, the bit error rate of the antenna selecting method in accordance with the embodiment is almost identical with the bit error rate characteristic of the second prior example in which the optimum combination for maximizing the channel capacity is selected. In addition, in comparison with the bit error rate characteristic of the first prior example, the bit error rate characteristic of the antenna selecting method in accordance with the embodiment approximates the bit error rate characteristic of the second prior example in which the optimum combination for minimizing the bit error rate is selected.

Accordingly, using the antenna selecting method in accordance with the embodiment, the optimum antenna combination may be precisely selected in regard to a bit error rate in addition to a channel capacity.

As described in the following, the antenna selecting method in accordance with the embodiment allows the amount of calculation of complex numbers to become smaller than that of those in the antenna selecting method of the first and second prior examples.

That is, in the antenna selecting method in accordance with the embodiment, the number of times the computing process is repetitively applied to the evaluation matrix Q in the first example illustrated in FIG. 3 is L at most. Similarly, the number of times the computing process is repetitively applied to the submatrix B in the second example illustrated in FIG. 4 is L at most.

In the first example, the amount of calculation of complex numbers in the initial calculation process for calculating the evaluation matrix Q (step S302) is $O(L^3+N_tL^2)$, and the amount of calculation of complex numbers in the calculation process using the update formula for updating the evaluation matrix Q (step S307) is $O(L\times(N_t-L))$. Similarly, in the second example, the amount of calculation of complex numbers in the initial calculation process for calculating the submatrix B (step S402) is $O(N_tL^2)$, and the amount of calculation of complex numbers in the calculation process using the update formula for updating the submatrix B (step S407) is $O(L\times(N_t-L))$.

Accordingly, the maximum amount of calculation of complex numbers that is performed until an antenna to be used is selected in the performing of the antenna selecting method in accordance with the embodiment may be expressed by the following formula, (34).

$$O(2N_tL^2) \tag{34}$$

Meanwhile, in the first prior example, to select L antennas, the calculation needs to be repeated $L(2N_t-L+1)/2$ times, and the amount of calculation of complex numbers for each of the repeated calculating processes is $O(L^2)$. Accordingly, the amount of calculation of complex numbers that is performed until an antenna to be used is selected in the performing of the first prior example may be expressed by the following formula, (35).

$$O(N_tL^3-(L-1)L^3/2) \tag{35}$$

In the second prior example, there are $_{N}C_L$ L-antenna combinations that may be selected from $N_t$ antennas, and the amount of calculation of complex numbers at an L×L channel matrix and the inverse matrix of this channel matrix is $O(2L^3)$. Accordingly, the amount of calculation of complex numbers that is performed until an antenna to be used is selected in the performing of the second prior example may be expressed by the following formula, (36).

$$O(2C_L^{N_t}L^3) \qquad (36)$$

A specific example of specifically comparing the amounts of calculation of complex numbers in the respective antenna selecting methods expressed by formulae (34) to (36) is illustrated in FIG. 7.

FIG. 7 illustrates a list in which the amount of calculation of complex numbers in the antenna selecting method in accordance with the embodiment is compared with the amount of calculation of complex numbers in antenna selecting methods of the first and second prior examples.

FIG. 7 illustrates the amount of calculation of complex numbers in each antenna selecting method in a situation in which the number of provided transmitting antennas 14 is eight and the number of selected transmitting antennas 14 is six, four or two.

As illustrated in FIG. 7, the amount of calculation of complex numbers in the antenna selecting method in accordance with the embodiment is remarkably smaller than the amount of calculation of complex numbers in the antenna selecting method in accordance with the second prior example. The amount of calculation of complex numbers in the antenna selecting method in accordance with the embodiment is equivalent to or smaller than the amount of calculation of complex numbers in the antenna selecting method in accordance with the first prior example.

Accordingly, the antenna selecting method in accordance with the embodiment may allow complexity of the process to be less than in the antenna selecting methods in accordance with the first and second prior examples, thereby shortening the processing time.

It should be noted that the antenna selecting method in accordance with the first embodiment is not limited to the specific examples that have been described with reference to FIG. 1 to FIG. 4.

As an example, in the descriptions above, in step S301 in FIG. 3 and step S401 in FIG. 4, the antenna selection processing unit 24 calculates an electric power value g (j) for each transmitting antenna 14. In step S302 in FIG. 3 and step S402 in FIG. 4, the antenna selection processing unit 24 selects L transmitting antennas in descending order of electric power value g(j). The antenna selection processing unit 24 then generates a selected-channel matrix $H_{sel}$ corresponding to the selected L transmitting antennas and a not-selected-channel matrix $H_{left}$ corresponding to the not-selected ($N_r$–L) transmitting antennas.

The process of step S302 in FIG. 3 for selecting L transmitting antennas with a high electric power value g(j) is effective to decrease the number of times the updating process for updating the evaluation matrix Q (step S307) is repeated until transmitting antennas 14 are ultimately selected in step S311. Similarly, the process of step S402 in FIG. 4 for selecting L transmitting antennas with a high electric power value g(j) is effective to decrease the number of times the updating process for updating the submatrix B (step S407) is repeated until transmitting antennas 14 are ultimately selected in step S411. This is because it is highly likely that the transmitting antennas selected in descending order of electric power value g(j) are included in the subset p of L transmitting antennas 14 ultimately selected as antennas that satisfy the antenna selecting criterion of maximizing the channel capacity.

However, instead of the aforementioned processes, the antenna selection processing unit 24 may perform the following processes. That is, the antenna selection processing unit 24 selects arbitrary L transmitting antennas from $N_t$ transmitting antennas 14. The antenna selection processing unit 24 then generates a selected-channel matrix $H_{sel}$ that corresponds to the selected L transmitting antennas 14 and a not-selected-channel matrix $H_{left}$ that corresponds to not-selected ($N_r$–L) transmitting antennas 14.

FIG. 9 illustrates an exemplary result of a simulation analysis of the needed number of times a process for updating an evaluation matrix Q is performed until a transmitting antenna 14 to be used is ultimately selected when L arbitrary transmitting antennas 14 are selected as initial values of the selected-channel matrix $H_{sel}$ as described above. FIG. 8 illustrates an exemplary result of a simulation analysis of the needed number of times a process for updating the evaluation matrix Q is performed until a transmitting antenna 14 to be used is ultimately selected when L transmitting antennas with a high electric power value g (j) are selected as initial values of the selected-channel matrix $H_{sel}$.

FIG. 8 illustrates a histogram of the needed number of times an updating process for updating an evaluation matrix is performed until an antenna to be used is selected when transmitting antennas with a high electric power value are selected as initial values of a selected-channel matrix. FIG. 9 illustrates a histogram of the needed number of times an updating process for updating an evaluation matrix is performed until an antenna to be used is selected when arbitrary transmitting antennas are selected as initial values of a selected-channel matrix.

FIG. 8 and FIG. 9 illustrate histograms of the number of times the updating process for updating the evaluation matrix Q is performed in a situation in which eight transmitting antennas 14 are provided, in which four transmitting antennas are selected, and in which the antenna selecting process in accordance with the embodiment is performed 10,000 times.

The horizontal axis of FIG. 8 and FIG. 9 represents the needed number of times the updating process for updating the evaluation matrix Q is performed until a transmitting antenna 14 to be used is ultimately selected, and the vertical axis represents the number of times an antenna selecting process is performed.

Comparing FIG. 8 with FIG. 9 clarifies that, in comparison with selecting L arbitrary transmitting antennas 14, selecting L transmitting antennas 14 with a high electric power value g(j) as initial values of the selected-channel matrix $H_{sel}$ may decrease the needed number of times the updating process for updating the evaluation matrix Q is performed until a transmitting antenna 14 to be used is selected.

Accordingly, selecting L transmitting antennas 14 with a high electric power value g(j) as initial values of the selected-channel matrix $H_{sel}$ may decrease a complexity of the antenna selecting process in accordance with the embodiment and may shorten the processing time.

Referring to FIG. 9, even when L arbitrary transmitting antennas 14 are selected as initial values of the selected-channel matrix $H_{sel}$, the antenna selecting process in accordance with the embodiment may be completed before a process for computing the evaluation matrix Q is repeatedly performed a theoretical maximum number of times, i.e., L times (eight times in the example of FIG. 9). That is, the antenna selecting process in accordance with the embodiment may be completed before the maximum amount of calculation of complex numbers expressed by formula (34) is reached.

Accordingly, even when L arbitrary transmitting antennas 14 are selected as initial values of the selected-channel matrix $H_{sel}$, the complexity of the antenna selecting process may be sufficiently decreased and the processing time may be sufficiently shortened.

[Second Embodiment]

For the first embodiment, descriptions were given of an exemplary situation in which one radio communication apparatus on the transmission side transmits transmitted data to one radio communication apparatus on the reception side. However, the antenna selecting method in accordance with the embodiment which was described with reference to FIG. 3 and FIG. 4 may be used when one radio communication apparatus on the transmission side transmits transmitted data simultaneously to a plurality of radio communication apparatuses on the reception side. A technology in which one radio communication apparatus on the transmission side transmits transmitted data simultaneously to a plurality of radio communication apparatuses on the reception side is called a multiuser MIMO communication technology.

Figure 10:
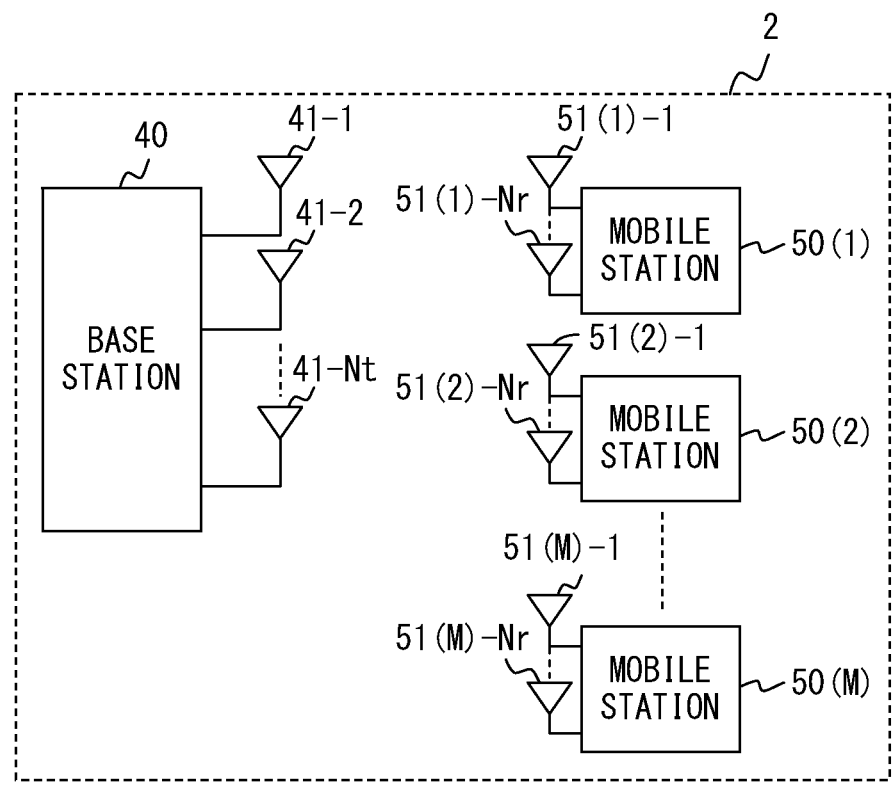
FIG. 10 is a block diagram illustrating a configuration of a radio communication system in accordance with a second embodiment.

FIG. 10 is a block diagram illustrating a configuration of a radio communication system in accordance with a second embodiment.

A radio communication system 2 illustrated in FIG. 10 includes a base station 40 and M (M is an integer that is two or greater) mobile stations 50(1) to 50(M), both of which are examples of the radio communication apparatus in accordance with the embodiment and are capable of performing MIMO communication. FIG. 10 illustrates one base station 40, but the radio communication system 2 may include a plurality of base stations 40. In the following descriptions, when the mobile stations 50(1) to 50(M) are not distinguished from each other, all of these stations will be referred to as "mobile stations 50(x)".

The base station 40 may be a radio communication apparatus on the transmission side that transmits data to the mobile stations 50 and may be a radio communication apparatus on the reception side that receives data transmitted from the mobile stations 50. The base station 40 in accordance with the second embodiment may include as appropriate an element similar to an element of the base station 10 and the mobile station 20 illustrated in FIG. 1.

The mobile station 50(x) may be a radio communication apparatus on the reception side that receives data transmitted from the base station 40 and may be a radio communication apparatus on the transmission side that transmits data to the base station 40. The mobile station 50(x) in accordance with the second embodiment may include as appropriate an element similar to an element of the mobile station 20 and the base station 10 illustrated in FIG. 1.

The base station 40 includes $N_t$ ($N_t$ is an integer that is two or greater) antennas 41-1 to 41-$N_t$.

The mobile stations 50(x) each include $N_r$ ($N_r$ is an integer that is two or greater) antennas 51(x)-1 to 51(x)-$N_r$. However, the mobile stations 50(x) may each include a different number of antennas. In the following descriptions, when the antennas 51(x)-1 to 51(x)-$N_r$ are not distinguished from each other, all of these antennas will be referred to as "antennas 51(x)".

Figure 11:
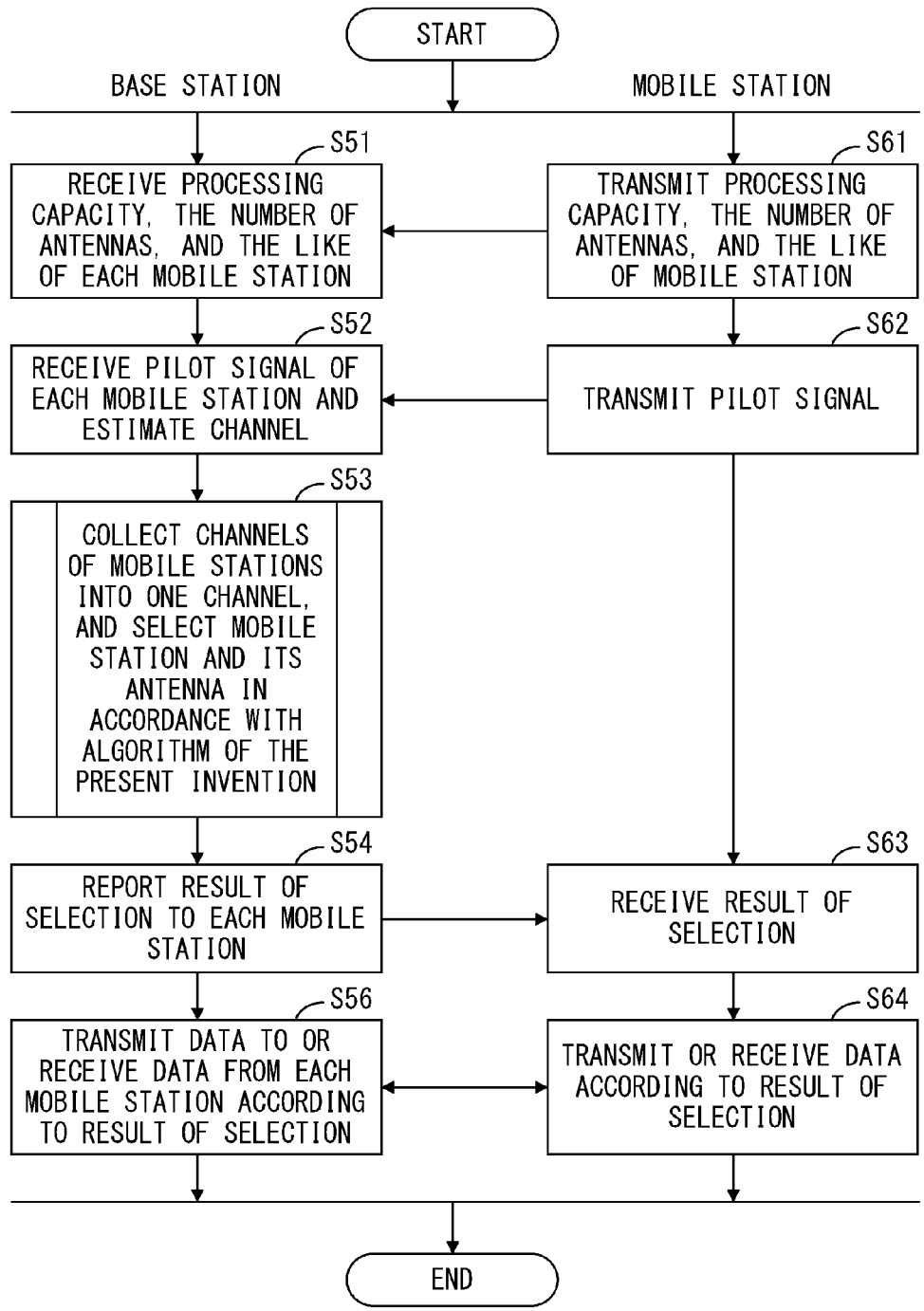
FIG. 11 illustrates an exemplary process flow of the radio communication system in accordance with the second embodiment.

FIG. 11 illustrates an exemplary process flow of the radio communication system in accordance with the second embodiment.

In step S61, M mobile stations 50(x) transmit to the base station 40 information relating to the number of antennas 51(x) and a processing capacity for processing data streams. In step S51, the base station 40 receives the information transmitted from the M mobile stations 50(x). The base station 40 recognizes, for example, the number of antennas 51(x) and the processing capacity of each of the M mobile stations 50(x), which are communications partners of the base station 40.

In step S62, the M mobile stations 50(x) transmit known signals such as pilot signals to the base station 40 via the antennas 51(x). In step S52, the base station 40 receives the pilot signals transmitted from the mobile stations 50(x) via the antennas 41 and estimates a channel matrix H(x) for each of the M mobile stations 50(x) by computing correlations between the received pilot signals and pilot replicas.

In step S53, the base station 40 collects channel matrixes H(x) of M mobile stations 50(x) into one channel matrix H. The collected channel matrix H is composed of $N_t$ rows and M×$N_r$ columns. When the channel matrix H includes more rows than columns, i.e., when $N_t$>M×$N_r$, the channel matrix H is transposed. The base station 40 selects L (L is an integer that is two or greater, and L≤$N_t$) antennas 51(x) that satisfy a predetermined antenna selecting criterion of maximizing the channel capacity from among M×$N_r$ antennas 51(x) provided at M mobile stations 50(x).

That is, in accordance with the antenna selecting process procedure in accordance with the embodiments described with reference to FIG. 3 and FIG. 4, the base station 40 selects a subset p of antennas 51(x) that maximizes the channel capacity $C_p$. Note that the transmitting antennas 14 in the antenna selecting process procedure described with reference to FIG. 3 and FIG. 4 correspond to the antennas 51(x) in the second embodiment. Also note that the receiving antennas 51 in the antenna selecting process procedure described with reference to FIG. 3 and FIG. 4 correspond to the antennas 41 in the second embodiment.

The subset p is a set of indexes of antennas 51(x) that satisfies the predetermined antenna selecting criterion from among M×$N_r$ antennas 51(x), and the subset p is composed of index values of L antennas 51(x). The subset p indicates the selected L antennas 51(x) to be used for communication and the selected mobile stations 50(x) which are provided with the selected L antennas 51(x).

In step S54, the base station 40 transmits to the mobile stations 50(x) antenna indexes indicating the selected L antennas 51(x). In step S63, the mobile stations 50(x) receive the antenna indexes transmitted from the base station 40.

In step S56, the base station 40 controls a directivity of the antennas 41 in accordance with the subset p and transmits data directed to the selected mobile stations 50(x). In step S64, in accordance with the antenna index received from the base station 40, the mobile station 50(x) receives data directed to this mobile station 50(x) from the base station.

As described above, using the antenna selecting method in accordance with the embodiment allows the combination of antennas that conform to a predetermined antenna selecting criterion to be precisely selected from antennas provided at radio communication apparatuses without increasing a complexity of the calculation process even in a radio communication system that uses a multiuser MIMO communication technology.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communication apparatus on a reception side that communicates with a radio communication apparatus on a transmission side that includes a plurality of transmitting antennas, the radio communication apparatus on the reception side comprising:
- a plurality of receiving antennas;
- an antenna selection processing unit configured to
  - select a transmitting antenna from the plurality of transmitting antennas,
  - generate a set that includes antenna indexes each indicating each of the plurality of transmitting antennas,
  - rearrange the antenna indexes in the generated set in sequence starting from an antenna index indicating the selected transmitting antenna,
  - generate a channel matrix which is composed of as many rows as the plurality of receiving antennas and as many columns as the plurality of transmitting antennas and in which a column corresponding to the selected transmitting antenna is located at a top, and generate a selected-channel matrix composed of the column corresponding to the selected transmitting antenna,
  - multiply an inverse matrix of the generated channel matrix by the selected-channel matrix so as to generate an evaluation matrix that includes an identity matrix composed of as many rows as the plurality of receiving antennas and that includes a submatrix that does not include the identity matrix,
  - rearrange the antenna indexes in the set in accordance with values of elements in the evaluation matrix, and
  - select an antenna to be used in accordance with the rearranged antenna indexes of the set; and
- a transmitting unit configured to transmit, to the radio communication apparatus on the transmission side, an antenna index that indicates the antenna to be used selected by the antenna selection processing unit.

2. The radio communication apparatus according to claim 1, wherein
the antenna selection processing unit
- acquires an element having a maximum value whose absolute value is higher than 1 from among the elements of the evaluation matrix,
- obtains a row number and a column number for the acquired element,
- updates the evaluation matrix by replacing an element at a column of the evaluation matrix that corresponds to the obtained column number with an element at a column of the evaluation matrix that corresponds to a same number as the obtained row number,
- replaces an antenna index in the set that corresponds to the obtained column number with an antenna index in the set that corresponds to the obtained row number, and
- returns to the acquiring process until an absolute value of each element of the updated evaluation matrix becomes one or lower.

3. The radio communication apparatus according to claim 2, wherein
when $Q^n$ indicates the evaluation matrix before updating and $Q^{n+1}$ indicates the evaluation matrix after updating, the antenna selection processing unit updates the evaluation matrix according to the following formula, (1), $$Q^{n+1} = Q^n - \frac{(Q^n_{*j} - e_i)(Q^n_{i*} - e_i^T + e_j^T)}{Q^n_{i,j}} \quad (1)$$

wherein $e_i$ represents an i-th column of an identity matrix, $e_j$ represents a j-th column of an identity matrix, "$[\ ]^T$" means transposition, and "$[\ ]^{-1}$" represents an inverse matrix, and, under a condition in which A is a matrix, $[A]_{ij}$ indicates an element at an i-th row and a j-th row of a matrix A, $A_{i*}$ indicates the i-th row of the matrix A, and $A_{*j}$ indicates a j-th column of the matrix A.

4. The radio communication apparatus according to claim 1, wherein
the antenna selection processing unit
- acquires an element having a maximum value whose absolute value is higher than 1 from among elements of the submatrix,
- obtains a row number and a column number for the acquired element,
- updates the submatrix by replacing an element at a column of the evaluation matrix that corresponds to the obtained column number with an element at a column of the evaluation matrix that corresponds to a same number as the obtained row number,
- replaces an antenna index in the set that corresponds to the obtained column number with an antenna index in the set that corresponds to the obtained row number, and
- returns to the acquiring process until an absolute value of each element of the updated submatrix becomes one or lower.

5. The radio communication apparatus according to claim 4, wherein
when $B^n$ indicates the submatrix before updating and $B^{n+1}$ indicates the submatrix after updating, the antenna selecting processing unit updates the submatrix according to the following formula, (2), $$B^{n+1} = B^n - (B_{*j0}^n - e_{i0})(B_{i0*}^n + e_{j0}^T)/B_{i0,j0}^n \quad (2)$$

wherein i0 and j0 respectively indicate an i0-th row and a j0-th column of a submatrix B, $e_{i0}$ represents an i0-th column of an identity matrix, $e_{j0}$ represents a j0-th column of an identity matrix, "$[\ ]^T$" means transposition, and "$[\ ]^{-1}$" represents an inverse matrix, and, under a condition in which A is a matrix, $[A]_{i0,j0}$ indicates an element at an i0-th row and a j0-th row of a matrix A, $A_{i0*}$ indicates the i0-th row of the matrix A, and $A_{*j0}$ indicates a j0-th column of the matrix A.

6. The radio communication apparatus according to claim 1, wherein
a transmitting antenna having a high electric power value is selected from the plurality of transmitting antennas.

7. The radio communication apparatus according to claim 6, wherein
electric power values of the plurality of transmitting antennas are values in a situation in which an average signal-to-noise ratio for the plurality of receiving antennas is large.

8. A radio communication system which includes a radio communication apparatus on a transmission side that communicates with the radio communication apparatus according to claim 1, the radio communication apparatus on the transmission side including
- a plurality of transmitting antennas,
- a receiving unit configured to receive the antenna index transmitted from the transmitting unit, and
- an antenna selection controlling unit configured to perform a control to select, from the plurality of transmitting antennas, an antenna corresponding to the antenna index received by the receiving unit as an antenna to be used for the communication.

9. A radio communication method performed by a radio communication apparatus on a reception side that communicates with a radio communication apparatus on a transmission side including a plurality of transmitting antennas and that includes a plurality of receiving antennas, the radio communication method comprising:

selecting a transmitting antenna from the plurality of transmitting antennas, generating a set that includes antenna indexes each indicating each of the plurality of transmitting antennas, and rearranging in sequence the antenna indexes in the generated set starting from an antenna index that indicates the selected transmitting antenna, generating a channel matrix which is composed of as many rows as the plurality of receiving antennas and as many columns as the plurality of transmitting antennas and in which a column corresponding to the selected transmitting antenna is located at a top, and generating a selected-channel matrix composed of the column corresponding to the selected transmitting antenna, multiplying an inverse matrix of the generated channel matrix by the selected-channel matrix so as to generate an evaluation matrix that includes an identity matrix composed of as many rows as the plurality of receiving antennas and that includes a submatrix that does not include the identity matrix, and rearranging the antenna indexes in the set in accordance with values of elements in the evaluation matrix, and selecting an antenna to be used in accordance with the rearranged antenna indexes of the set by using an antenna selection processing unit, and transmitting by using a transmitting unit, to the radio communication apparatus on the transmission side, an antenna index that indicates the antenna to be used selected by the antenna selection processing unit.

10. A radio communication apparatus on a transmission side that communicates with a plurality of radio communication apparatuses on a reception side, each of which includes a plurality of receiving antennas, the radio communication apparatus on the transmission side comprising:

an antenna selection processing unit configured to select a receiving antenna from the plurality of receiving antennas, generate a set that includes antenna indexes each indicating each of the plurality of receiving antennas, rearrange the antenna indexes in the generated set in sequence starting from an antenna index indicating the selected receiving antenna, generate a channel matrix which is composed of as many rows as the plurality of transmitting antennas and as many columns as the plurality of receiving antennas and in which a column corresponding to the selected receiving antenna is located at a top, and generate a selected-channel matrix composed of the column corresponding to the selected receiving antenna, multiply an inverse matrix of the generated channel matrix by the selected-channel matrix so as to generate an evaluation matrix that includes an identity matrix composed of as many rows as the plurality of transmitting antennas and that includes a submatrix that does not include the identity matrix, rearrange the antenna indexes in the set in accordance with values of elements in the evaluation matrix, and select an antenna to be used in accordance with the rearranged antenna indexes of the set; and a transmitting unit configured to transmit, to the radio communication apparatuses on the reception side, an antenna index that indicates the antenna to be used selected by the antenna selection processing unit.

11. A radio communication system which includes a radio communication apparatus on a reception side that communicates with the radio communication apparatus according to claim 10, the radio communication apparatus on the reception side including a plurality of receiving antennas, a receiving unit configured to receive the antenna index transmitted from the transmitting unit, and an antenna selection controlling unit configured to perform a control to select, from the plurality of receiving antennas, an antenna corresponding to the antenna index received by the receiving unit as an antenna to be used for the communication.

* * * * *